(12) United States Patent
Sung et al.

(10) Patent No.: US 8,972,176 B2
(45) Date of Patent: Mar. 3, 2015

(54) METHOD FOR DISPLAYING MARKER IN A MAP SERVICE

(75) Inventors: Joo-Il Sung, Seoul (KR); Han-Kyung Jeon, Seongnam-si (KR); Chan-Su Ahn, Seoul (KR); Young-Il Oh, Gwacheon-si (KR); Je-Sang Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 13/418,592

(22) Filed: Mar. 13, 2012

(65) Prior Publication Data

US 2012/0274652 A1 Nov. 1, 2012

(30) Foreign Application Priority Data

Apr. 29, 2011 (KR) .......................... 10-2011-0041077

(51) Int. Cl.
G09B 29/10 (2006.01)
G09B 29/00 (2006.01)

(52) U.S. Cl.
CPC .............. *G09B 29/007* (2013.01); *G09B 29/10* (2013.01)
USPC .......................................... 701/438; 701/426

(58) Field of Classification Search
USPC .......... 345/629, 592; 701/408–454, 531, 532; 705/7.13–7.17, 7.21–7.23, 7.35, 7.38, 705/7.39, 14.1–14.13, 14.2, 14.21, 14.25, 705/14.27–14.32
See application file for complete search history.

(56) References Cited

U.S. PATENT DOCUMENTS

| | | | | |
|---|---|---|---|---|
| 5,801,680 A | * | 9/1998 | Minakuchi | 345/589 |
| 6,064,941 A | * | 5/2000 | Nimura et al. | 701/416 |
| 7,697,013 B2 | * | 4/2010 | Dolph et al. | 345/629 |
| 2004/0268229 A1 | * | 12/2004 | Paoli et al. | 715/508 |
| 2007/0143345 A1 | * | 6/2007 | Jones et al. | 707/104.1 |
| 2007/0226004 A1 | * | 9/2007 | Harrison | 705/1 |
| 2008/0162031 A1 | | 7/2008 | Okuyama et al. | |
| 2010/0114480 A1 | * | 5/2010 | Sugiyama et al. | 701/207 |
| 2010/0257016 A1 | * | 10/2010 | Pace et al. | 705/9 |
| 2011/0093778 A1 | | 4/2011 | Kim et al. | |
| 2012/0136865 A1 | * | 5/2012 | Blom et al. | 707/739 |

FOREIGN PATENT DOCUMENTS

| | | |
|---|---|---|
| EP | 2 034 273 A2 | 3/2009 |
| KR | 10-2001-0106180 A | 11/2001 |
| KR | 10-2002-0006120 A | 1/2002 |
| KR | 10-2008-0068845 A | 7/2008 |
| KR | 10-2010-0054184 A | 5/2010 |
| KR | 10-2011-0042852 A | 4/2011 |

* cited by examiner

*Primary Examiner* — Xiao M. Wu
*Assistant Examiner* — Steven Elbinger
(74) *Attorney, Agent, or Firm* — Jefferson IP Law, LLP (57) ABSTRACT

A method for displaying a marker in a map service is provided. In the method, a plurality of markers each representing information are displayed differentially in a propagation range set according to importance of a user in the map service, and when the plurality of markers are displayed overlapped, only a marker representing information of highest importance is displayed.

20 Claims, 7 Drawing Sheets

METHOD FOR DISPLAYING MARKER IN A MAP SERVICE

PRIORITY

This application claims the benefit under 35 U.S.C. §119(a) of a Korean patent application filed in the Korean Intellectual Property Office on Apr. 29, 2011 and assigned Serial No. 10-2011-0041077, the entire disclosure of which is incorporated herein by reference.

BACKGROUND OF THE INVENTION

1. Field of the Invention

The present invention relates to a method for displaying markers in a map service. More particularly, the present invention relates to a method for displaying a plurality of markers differentially according to the importance of a user and the importance of information in a map service.

2. Description of the Related Art

Along with the recent growth in sales of smart phones, the number of Social Networking Service (SNS) users has also been increasing.

SNS extends the concept of society to a communication network, enabling users to establish a network by building interpersonal relationships.

At present, many companies provide SNS. SNS users build solidarity with other networked SNS users.

As SNS gains in popularity, users are requesting a variety of SNSs.

A map service included in an SNS displays a plurality of markers representing information so that a user can be aware of the existence of the information at the positions of the markers.

However, the plurality of markers are displayed with the same importance irrespective of the importance of the information represented by the markers. Therefore, the user is simply aware of the existence of the information at the positions of the markers, without the divergent importance among the plurality of markers being readily apparent.

Moreover, when a map is scaled down, the markers may overlap on the map in the map service. As a consequence, the user may not be able to discriminate the markers from one another.

SUMMARY OF THE INVENTION

Aspects of exemaplry embodiments of the present invention are to address at least the above-mentioned problems and/or disadvantages and to provide at least the advantages described below. Accordingly, an aspect of exemplary embodiments of the present invention is to provide a method for displaying respective markers of a plurality of markers differentially according to the importance of a user and the importance of information represented by the markers in a map service.

Another aspect of exemplary embodiments of the present invention is to provide a method for displaying respective markers of a plurality of overlapped markers differentially according to the importance of information represented by the markers in a map service.

In accordance with an exemplary embodiment of the present invention, a method for displaying a marker in a map service is provided. The method includes a plurality of markers each representing information are displayed differentially in a propagation range set according to importance of a user in the map service, and when the plurality of markers are displayed overlapped, only a marker representing information of highest importance is displayed.

In accordance with another exemplary embodiment of the present invention, at least one non-transitory processor readable medium is provided. The at least one non-transitory processor readable medium stores a computer program of instructions configured to be readable by at least one processor for instructing the at least one processor to execute a computer process for performing the above method.

In accordance with yet another exemplary embodiment of the present invention, an apparatus for displaying a marker in a map service is provided. The apparatus includes a display and a processor. The display displays the map service. The processor controls to differentially display on the display a plurality of markers each representing information in a propagation range set according to importance of a user in the map service, and controls to display on the display only a marker representing information of highest importance, when the plurality of markers are displayed overlapped.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
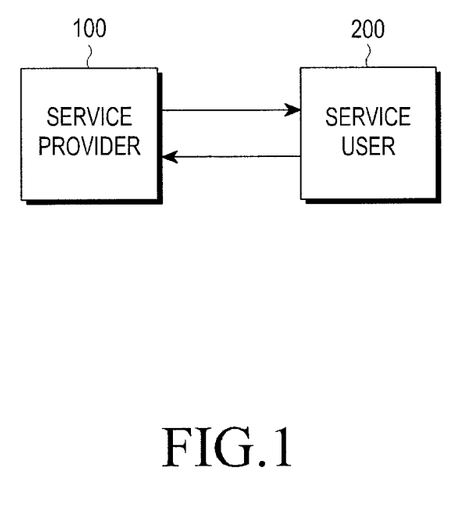
FIG. 1 is a block diagram of a Social Networking System (SNS) for providing a map service according to an exemplary embodiment of the present invention.

FIG. 1 is a block diagram of a Social Networking System (SNS) for providing a map service according to an exemplary embodiment of the present invention.

Referring to FIG. 1, the SNS includes a service provider 100 and a service user 200.

The service provider 100 may include a server for performing wired/wireless network communication and may provide a map service to the service user 200 that subscribes to an SNS.

The service provider 100 may store information about at least one of user importance of the service user 200, a propagation range being a maker display range in the map service, and the importance of information represented by markers.

The service provider 100 may store the user class of the service user 200 as the user importance of the service user 200 and may update the user class in real time according to at least one of the number of service uses, acquired points, the participation of the service user 200 in events held in the SNS, and the importance of information provided by the service user 200.

The propagation range refers to the display range of markers representing information in the map service according to the user importance of the service user 200. The service provider 100 may set the propagation range according to the user importance. If the user importance is updated in real time, the service provider 100 may also set the propagation range in real time.

The importance of information represented by a marker refers to a weight applied to the information in the map service. The service provider 100 may or may not display markers, or may display markers differentially, according to the importance of information represented by the markers.

The service provider 100 may update the importance of information in real time according to at least one of the user class of a user that has provided the information, responsiveness to the information such as the number of replies to the information, the number of views for the information, the number of recommendations that the information has received, a last update date of the information, and an expiration time of the information. In addition, the service provider 100 may display markers differentially in at least one of size, color, shape, and transparency and may change a displayed propagation range, according to the real-time importance of information represented by the markers.

The service provider 100 may store, as personal information of the service user 200, basic information of the service user 200 such as at least one of an IDentifier (ID), a name, an age, a gender, etc. of the service user 210 and details of the service user 200 such as at least one of an education level, tastes, hobbies, etc.

When the service user 200 connects to the service provider 100 and requests the map service, the service provider 100 may differentially display information corresponding to tastes and interests of the service user 200 included in the stored personal information by means of markers.

The service provider 100 may display a plurality of markers representing a plurality of pieces of information to the service user 200, differentially in at least one of size, color, shape, and transparency according to the importance of the information or the tastes and interests of the service user 200.

The service user 200 may make a decision as to how markers are to be displayed differentially or change existing differentially displayed markers in terms of at least one of size, color, shape, and transparency.

The service provider 100 may display markers of the same importance differentially according to the distances between the service user 200 and the markers.

The service provider 100 may display markers differentially in at least one of size, shape, color, and transparency according to a change in the distances between the service user 200 and the markers in a propagation range set based on the user importance of the service user 200 or the importance of information represented by the markers.

If a plurality of neighboring markers are displayed overlapped in the map service, the service provider 100 may display the markers differentially in at least one of size, shape, color and transparency according to the importance of information represented by the markers.

If display of information is set as restricted by an information provider, the service provider 100 may restrict the display of a marker representing the information in the map service even though the information falls into the propagation range.

The service provider 100 may display markers in a propagation range set manually by the service user 200. The manually set propagation range should be within a propagation range set according to the user importance of the service user 200.

The service provider 100 may provide the service user 200 with information about an event or activity that will increase the user importance of the service user 200 in the SNS.

When a map is scaled down and thus a plurality of markers are overlapped on the map in the map service, the service provider 100 may determine the importance of information represented by the markers and display only a marker representing information with a highest priority level based on the importance of the information.

With the marker representing the information with the highest priority level displayed in the map service, the service provider 100 may indicate the existence of markers that represent information with lower priority levels and thus are not displayed. For example, the number of non-displayed markers representing information with lower priority levels may be displayed in the vicinity of the marker representing the information with the highest priority level. Alternatively, when the marker representing the information with the highest priority level is touched, the number of non-displayed markers with lower priority levels may be displayed. Alternatively, when the marker representing the information with the highest priority level is touched, the non-displayed markers with lower priority levels may be displayed for a predetermined time adjacent or otherwise near the marker representing the information with the highest priority level.

Alternatively, with the marker representing the information with the highest priority level displayed in the map service, the service provider 100 may display markers with lower priority levels transparently. Herein, the transparency of the markers with lower priority levels may be different according to the priority levels of the respective markers.

Alternatively, with the marker representing the information with the highest priority level displayed in the map service, the service provider 100 may display the markers with lower priority levels differentially from the marker representing the information with the highest priority level.

When the displayed marker representing the information with the highest priority level is touched, the service provider 100 may display an information list of the markers that represents information with lower priority levels and thus are not displayed.

Each time the displayed marker representing the information with the highest priority level is touched, the service provider 100 may display the non-displayed markers with lower priority levels in a predetermined order.

While the marker representing the information with the highest priority level is being displayed, the service provider 100 may deactivate the markers that represent information with lower priority levels and thus are displayed transparently or in a different shape from the marker representing the information with the highest priority level.

The service user 200 may be a portable terminal of a user that has subscribed to the SNS including the map service and thus receives the map service.

According to exemplary embodiments of the present invention, the portable terminal may be any of a Global System for Mobile communication (GSM) terminal, a Universal Mobile Telecommunication Service (UMTS) terminal, a Code Division Multiple Access (CDMA) terminal, a Wideband Code Division Multiple Access (WCDMA) terminal, an International Mobile Telecommunication 2000 (IMT-2000) terminal, a General Packet Radio Service (GPRS) terminal, etc. Accordingly, the portable terminal may include a display for displaying information to a user, a processor for controlling the portable terminal and controlling the portable terminal to perform any of the functions described herein, an input unit for receiving input from the user, a memory for storing data, a transceiver for transmitting and/or receiving data, etc.

Upon request of the service provider 100, the service user 200 transmits personal information to the service provider 100. The personal information may include basic information such as at least one of a name, a gender, a height, an age, a nickname for conversation, etc. and personal details such as at least one of an education level, tastes, preferences, interests, etc.

The service user 200 may access the service provider 100 and request the map service to the service provider 100, so as to display a plurality of markers representing information differentially according to the user importance of the service user 200 or the importance of the information, or according to the user importance, tastes, and interests of the service user 200 in the map service.

An operation for displaying markers in the map service in the social networking system will be described in more detail with reference to FIGS. 2 to 4G.

Figure 2:
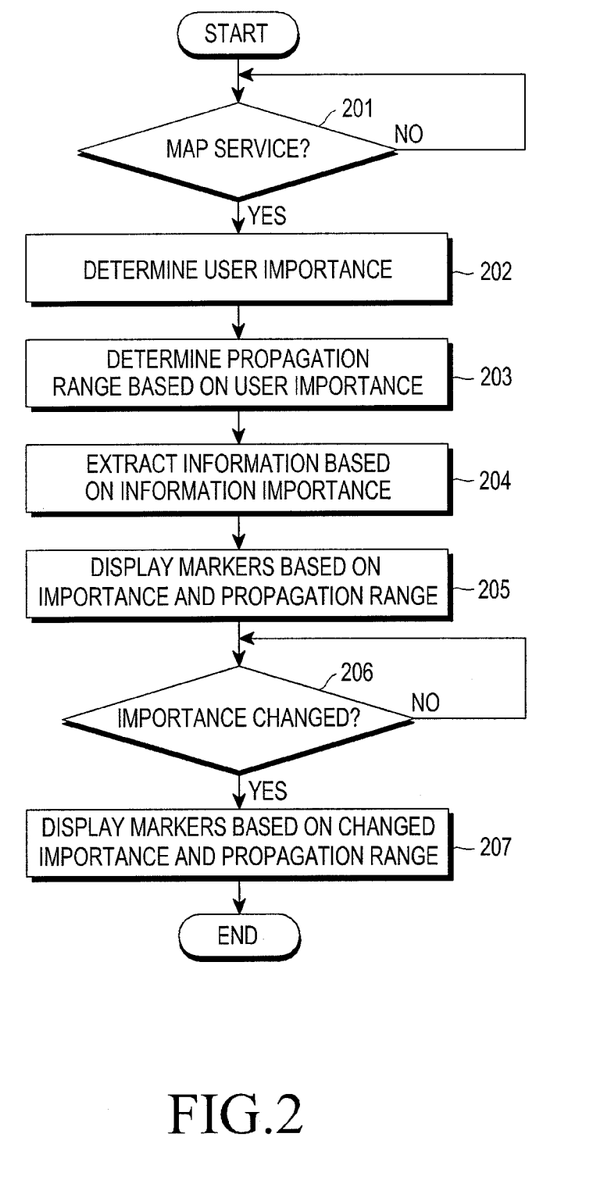
FIG. 2 is a flowchart illustrating an operation for displaying markers according to their respective importance in a map service according to an exemplary embodiment of the present invention.

FIG. 2 is a flowchart illustrating an operation for displaying markers according to their respective importance in a map service according to an exemplary embodiment of the present invention.

Exemplary embodiments of the present invention will be described with reference to FIGS. 1 and 2.

Referring to FIG. 2, upon request of the service user 200 connected to the service provider 100 for the map service in step 201, the service provider 100 determines the user importance of the service user 200 in step 202.

More specifically, the service provider 100 determines the stored user class of the service user 200 to thereby determine the user importance of the service user 200 in step 202.

The user importance represents the user class of the service user 200 in a subscribed service. The user class involves at least one of the number of service uses, acquired points, the participation of events held in the service, and the importance of information provided by the service user 200.

In step 203, the service provider 100 determines a propagation range according to the user importance, that is, the user class of the service user 200.

For instance, if propagation levels 1 to 15 are defined and user classes are defined as beginner, intermediate, and premium, the service provider 100 may set a propagation range spanning from level 1 to level 5 for a beginner member, a propagation range spanning from level 6 to level 10 for an intermediate member, and a propagation range spanning from level 11 to level 15 for a premium member.

Once the propagation range is set according to the user importance of the service user 200, the service provider 100 determines the importance of information within the propagation range in step 204.

The importance of information involves at least one of the user class of an information provider in the subscribed service, responsiveness to the information, a last update date of the information, and an expiration time of the information.

More specifically, the service provider 100 determines the importance of information within the propagation range and extracts information with a predetermined importance level or higher. For example, if information importance levels are defined as high, medium, and low, the service provider 100 may extract only information at the high or medium level.

Alternatively or additionally, the service provider 100 may extract information at an importance level corresponding to the user importance of the service user 100. For instance, if the user class is intermediate or higher, the service provider 100 may extract only information at the medium or high importance level.

Herein, the service provider 100 may exclude information set as display-restricted from the information that falls into the propagation range.

Then, the service provider 100 provides to the service user 200 with a map service that displays markers representing the extracted information according to the user importance, the information importance, and the propagation range in step 205.

More specifically, the service provider 100 provides the service user 200 with a map service that displays the markers differentially in at least one of shape, size, color, and transparency according to the importance of the information represented by the markers. Thus, the service user 200 may display the markers differentially according to the importance in the map service.

Alternatively, the service provider 100 may provide the service user with a map service that displays the markers differentially in at least one of shape, size, color, and transparency according to the tastes and interests of the service user 200 stored as personal information as well as the importance of the information represented by the markers.

In addition, the service provider 100 may provide the service user 200 with a map service that displays markers of the same importance differentially according to the distances between the service user 200 and the markers.

Alternatively, the service provider 100 may display information corresponding to personal tastes and interests by means of markers, upon request of the service user 200.

It may be further contemplated that the service provider 100 reads information about the tastes and interests stored as the personal information of the service user 200 and extracts only information matching the tastes and interests within the propagation range, instead of the information importance in step 204 and provides the service user 200 with a map service in which markers representing the extracted information are displayed according to the user importance, the tastes and interests, and the propagation range in step 205.

Herein, the service provider 100 may provide the service user 200 with a map service in which the markers can be displayed differentially in at least one of shape, size, color, and transparency according to the user importance and the personal tastes and interests.

While the map service is being provided to the service user 200, upon detection of a change in the user importance and/or the information importance in step 206, the service provider 100 may provide the service user 200 with the map service in such a manner that changed markers are displayed according to the changed importance and propagation range in step 207.

The user importance of the service user 200 is the user class of the service user 200. When at least one of the number of service uses, acquired points, participation in events held in the service, and the importance of information provided by the service user 200 is changed, the service provider 100 updates the user importance in real time according to the change.

When at least one of the user class of an information provider that has provided information in the service subscribed by the service user 200, responsiveness to the information, a last update date of the information, and an expiration time of the information is changed, the service provider 100 updates the importance of the information in real time according to the change.

In this manner, the service provider 100 can provide the service user with the map service in real time, in which markers representing information are displayed by reflecting a change in the user importance and/or the information importance in real time.

FIGS. 4A to 4G are views referred to for describing display of markers in a map service according to exemplary embodiments of the present invention.

Figure 4A:
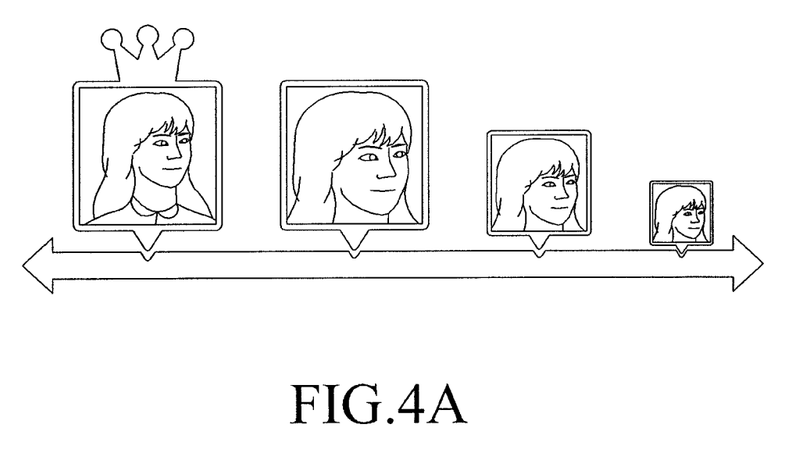
FIGS. 4A to 4G are views referred to for describing display of markers in a map service according to exemplary embodiments of the present invention.

FIG. 4A illustrates markers displayed in different sizes according to the importance of information represented by the markers according to an exemplary embodiment of the present invention. In many other ways, the markers may be displayed differentially in a map service according to the information importance, as stated above.

Figure 4B:
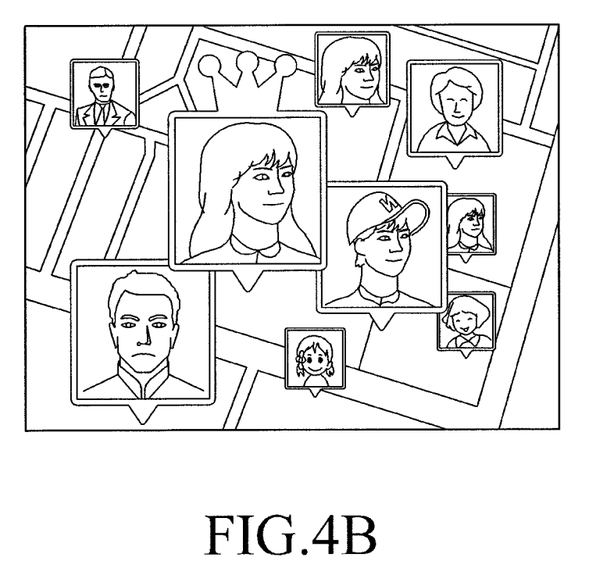

FIG. 4B illustrates markers that the service user 200 displays in different sizes according to information importance in a map service provided by the service provider 100 according to an exemplary embodiment of the present invention.

Figure 4C:
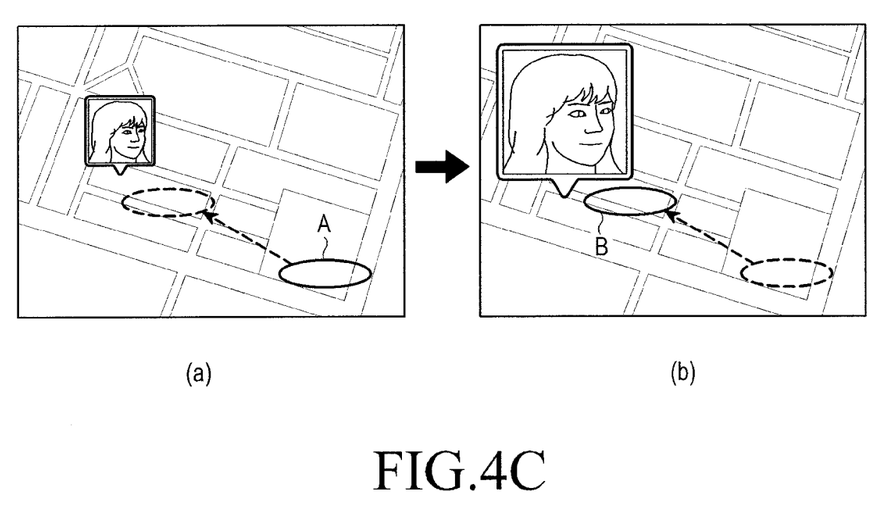

FIG. 4C illustrates a marker that the service user displays in different sizes in real time according to changed distances between the service user 200 and the marker in a set propagation range in a map service provided by the service provider 100 according to an exemplary embodiment of the present invention.

Referring to FIG. 4C, when the service user 200 moves from a position A in (a) of FIG. 4C to a position B in (b) of FIG. 4C, approaching the position of the marker, the marker may be displayed larger than when the service user 200 is located at the position A.

Figure 4D:
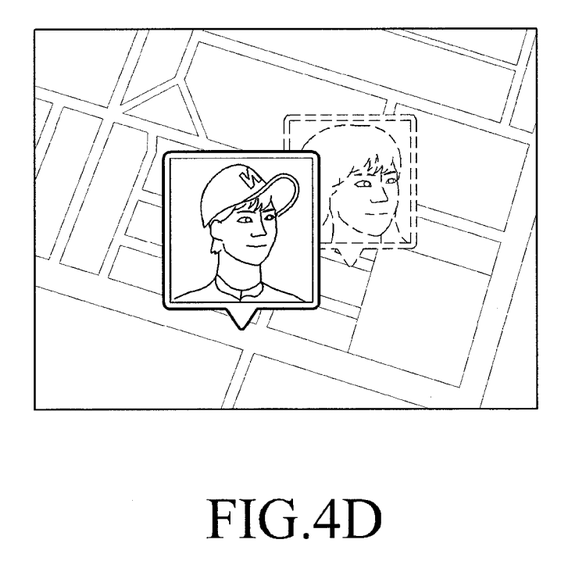

FIG. 4D illustrates overlapped markers at nearby positions that the service user 200 displays to different transparency degrees according to the importance of information represented by the markers in a map service provided by the service provider 100 according to an exemplary embodiment of the present invention.

Figure 4E:
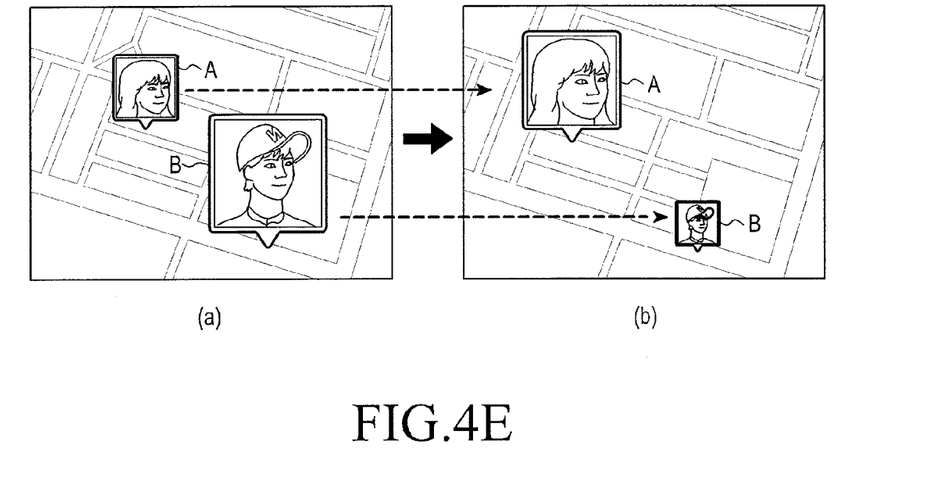
Figure 4F:
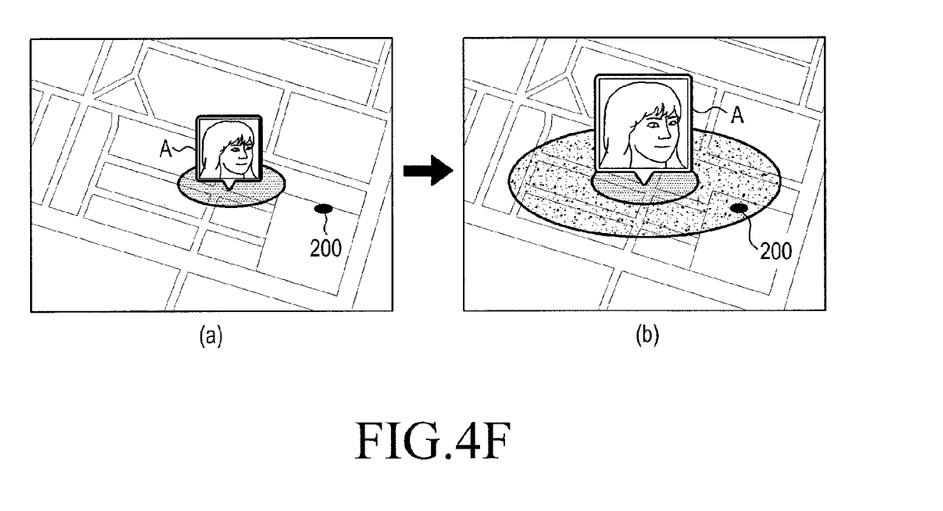

FIGS. 4E and 4F illustrate markers that the service user 200 displays in real time, when information about the markers is changed according to responsiveness of information such as at least one of a user class, the number of replies, the number of views, the number of recommendations, a last update date of the information, and an expiration time of the information in the map service provided by the service provider 100 according to exemplary embodiments of the present invention.

Referring to FIG. 4E, information represented by a marker A gets more important, for example, due to an increase in the number of views for the information in (a) of FIG. 4E. Thus, the marker A is displayed larger in (b) of FIG. 4E. On the other hand, information represented by a marker B gets less important, for example, due to a decrease in the number of views for the information in (a) of FIG. 4E. Thus, the marker B is displayed smaller in (b) of FIG. 4E.

Referring to FIG. 4F, in (a) of FIG. 4F, information represented by a marker A gets more important, for example, due to an increase in the number of views for the information. Thus, the marker A is displayed larger and a propagation range in which the marker A can be displayed is also widened in (b) of FIG. 4F. The widened propagation range in (b) of FIG. 4F includes service user 200.

Figure 3:
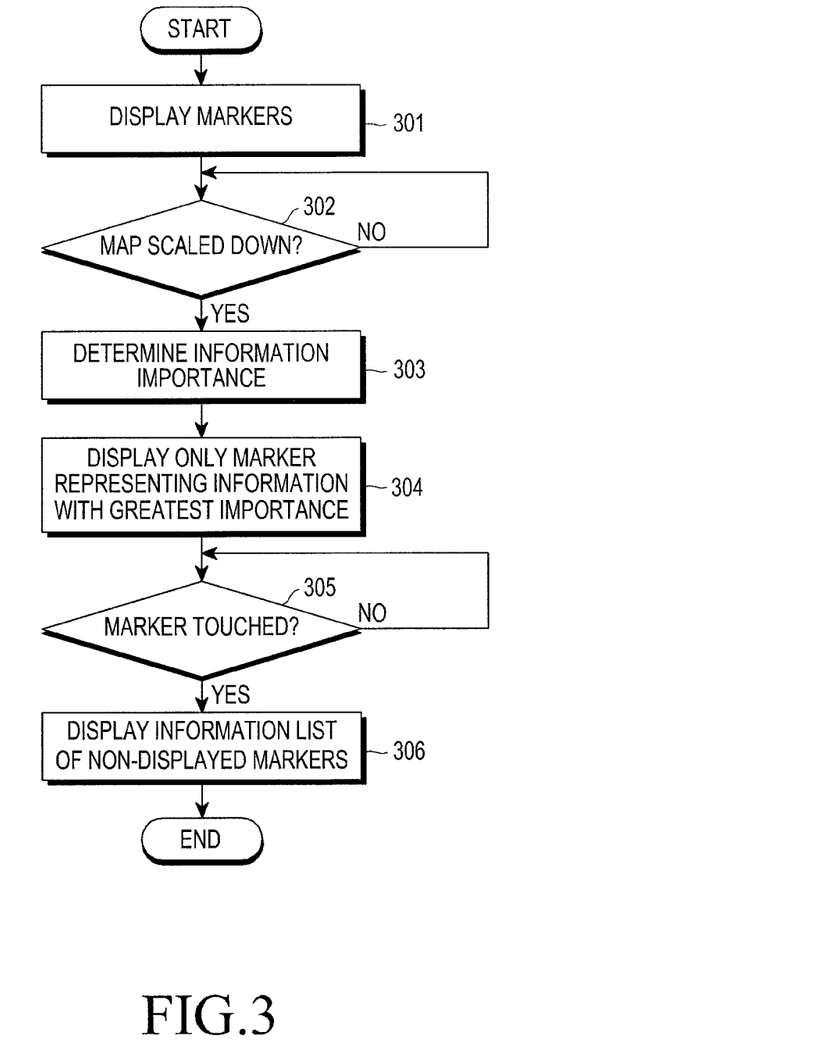
FIG. 3 is a flowchart illustrating an operation for displaying overlapped markers according to their respective importance in a map service of a portable terminal according to an exemplary embodiment of the present invention.

FIG. 3 is a flowchart illustrating an operation for displaying overlapped markers according to their respective importance in a map service of a portable terminal according to an exemplary embodiment of the present invention.

Exemplary embodiments of the present invention will be described below with reference to FIGS. 1 and 3.

Referring to FIG. 3, while the service user 200 is displaying a plurality of markers in a map service provided by the service provider 100 in step 301, when a map is scaled down and thus the markers are overlapped in step 302, the service provider 100 determines the importance of information represented by the overlapped markers in step 303.

The service provider 100 provides the map service to the service user 200 in such a manner that only a marker representing information with a highest priority level is displayed according to the determined information importance in step 304.

In addition, the service provider 100 may indicate the existence of markers that represent information with lower priority levels and thus are not displayed by a number, display the markers that represent information with lower priority levels around the marker representing the information with the highest priority level for a predetermined time, or display the markers that represent information with lower priority levels to different transparency degrees according to their priority levels.

In addition, the service provider 100 may display the markers that represent information with lower priority levels differentially from the marker representing the information with the highest priority level in at least one of shape, size, and color.

While the marker representing the information with the highest priority level is being displayed, the service provider 100 may deactivate the markers that represent information with lower priority levels and thus are displayed transparently or differentially from the marker representing the information with the highest priority level.

When the displayed marker representing the information with the highest priority level is touched in step 305, the service provider 100 may provide the service user 200 with an information list of the markers that represent information with lower priority levels and thus are not displayed, so that the service user 200 can display the information list in the map service in step 306.

Each time the displayed marker representing the information with the highest priority level is touched, the service provider 100 may provide the service user 200 with the map service in such a manner that the non-displayed markers with lower priority levels can be displayed in a predetermined order.

Figure 4G:
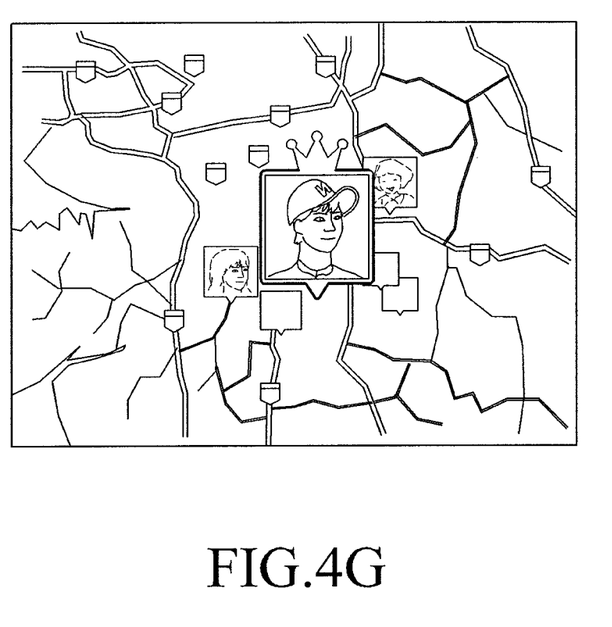

FIG. 4G illustrates markers displayed by the service user 200 in a map service provided by the service provider 100 according to an exemplary embodiment of the present invention. Referring to FIG. 4G, in the map service, when a map is scaled down and thus a plurality of markers are displayed overlapped, only a marker representing information with a highest priority level is displayed according to information importance, while the other markers are displayed to different transparency degrees in different sizes according to the priority levels of information represented by the markers.

As is apparent from the above description of the method for displaying markers in a map service according to exemplary embodiments of the present invention, a plurality of markers are displayed differentially according to the importance of information represented by the markers in the map service. In addition, when a map is scaled down and markers are displayed overlapped, only a marker with a highest priority level is displayed. In this manner, markers representing information can be displayed effectively.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more non-transitory processor readable mediums. Examples of the non-transitory processor readable mediums include Read-Only Memory (ROM), Random-Access Memory (RAM), Compact Disc (CD)-ROMs, magnetic tapes, floppy disks, and optical data storage devices. The non-transitory processor readable mediums can also be distributed over network coupled computer systems so that the instructions are stored and executed in a distributed fashion. Also, functional computer programs, instructions, and instruction segments for accomplishing the exemplary embodiments of present invention can be easily construed by programmers skilled in the art to which the exemplary embodiments of present invention pertains.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for displaying a marker in a map service, the method comprising:
    determining a propagation range corresponding to an importance of a user among a plurality of propagation ranges;
    setting a propagation range of the user using the determined propagation range;
    differentially displaying a plurality of markers each representing information in the set propagation range; and
    displaying only a marker representing information of highest importance, when the plurality of markers are displayed overlapped,
    wherein the user in the map service is an individual requesting the displaying of the plurality of markers.

2. The method of claim 1, wherein the importance of the user is a class of the user in a subscribed service and the class of the user is updated in real time according to at least one of a number of service uses, acquired points, participation in an event held in the subscribed service, and importance of information provided by the user.

3. The method of claim 1, wherein the differentially displaying of the plurality of markers comprises:
    extracting information to be represented by markers from among information within the propagation range, according to importance of the information; and
    differentially displaying the markers representing the extracted information according to the importance of the information.

4. The method of claim 3, wherein the importance of the information is updated in real time according to at least one of a class of a user that provides the information in the subscribed service, responsiveness to the information, a last update date of the information, and an expiration time of the information.

5. The method of claim 3, wherein markers of the same importance are displayed differentially according to a distance between a current location of the user in the map and a location of the markers in the map.

6. The method of claim 3, further comprising, if the importance of the user or the importance of information is changed, differentially displaying the plurality of markers, each representing information in the propagation range according to the changed importance.

7. The method of claim 3, wherein the plurality of markers are displayed differentially in at least one of size, color, and transparency according to the importance of the information or the tastes and interests of the user.

8. The method of claim 1, wherein the differentially displaying of the plurality of markers comprises:
    extracting information to be represented by markers from among information within the propagation range, according to tastes and interests of the user; and
    differentially displaying the markers representing the extracted information according to the tastes and interests of the user.

9. The method of claim 8, wherein the tastes and interests of the user are included in personal information of the user stored in the subscribed service.

10. The method of claim 1, wherein the displaying of only a marker representing information of highest importance comprises:
    determining, if a map is scaled down during the differentially displaying of the plurality of markers and the plurality of markers are displayed overlapped in the map service, the importance of the information represented by the markers; and
    displaying a marker with a highest priority level at an uppermost end according to the importance of the information.

11. The method of claim 10, wherein existence of a marker that is not displayed due to a lower priority level among the plurality of markers is indicated.

12. The method of claim 10, wherein a marker with a lower priority level is displayed transparently.

13. The method of claim 12, wherein the transparency of marker with the lower priority level is adjusted according to a priority level of the marker.

14. The method of claim 10, wherein a marker with a lower priority level is displayed differentially from the marker with the highest priority level.

15. The method of claim 10, further comprising displaying an information list of non-displayed markers among the plurality of markers, when the marker displayed at the uppermost end is touched.

16. The method of claim 10, further comprising displaying non-displayed markers in an order of priority levels of the non-displayed markers, each time the marker displayed at the uppermost end is touched.

17. The method of claim 10, wherein, when a marker with a lower priority level from among the plurality of markers is displayed transparently, the marker with the lower priority level is deactivated.

18. At least one non-transitory processor readable medium for storing a computer program of instructions configured to be readable by at least one processor for instructing the at least one processor to execute a computer process for performing the method as recited in claim 1.

19. An apparatus for displaying a marker in a map service, the apparatus comprising:
a display configured to display the map service; and
a processor configured to determine a propagation range corresponding to an importance of a user among a plurality of propagation ranges, to set a propagation range of the user using the determined propagation range, to differently display a plurality of markers each representing information in the set propagation range, and to display on the display only a marker representing information of highest importance, when the plurality of markers are displayed overlapped,
wherein the user in the map service is an individual requesting the displaying of the plurality of markers.

20. The apparatus of claim 19, further comprising a transceiver for receiving the map service from a service provider.

* * * * *